(No Model.)
C. BENNETT.
MILK PAIL.
No. 500,094. Patented June 20, 1893.
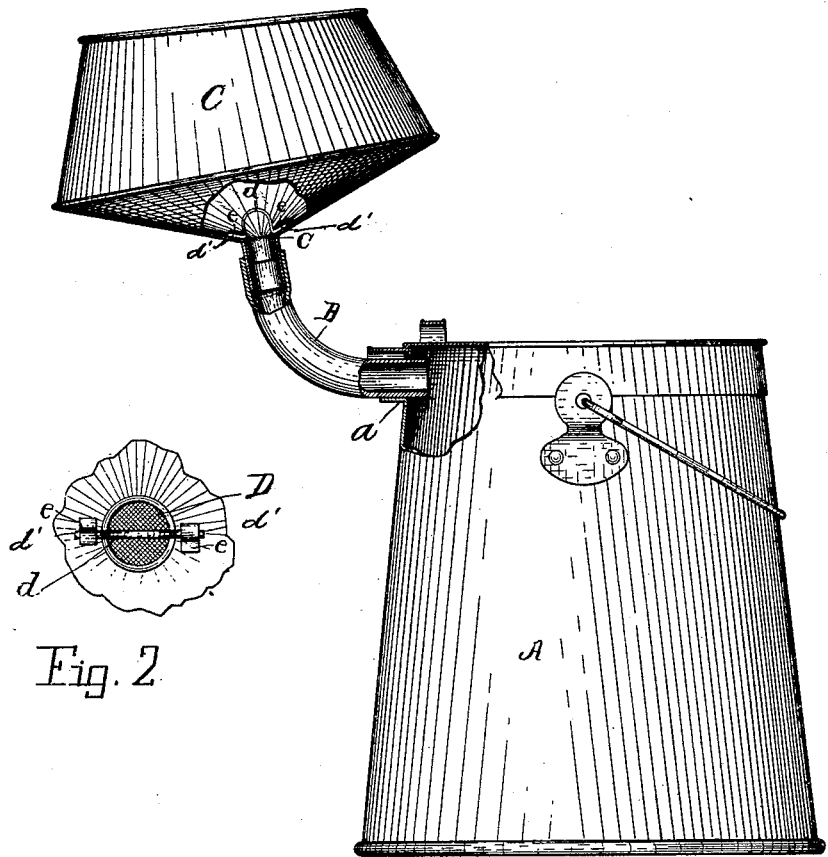
Fig. 2
Fig. 1
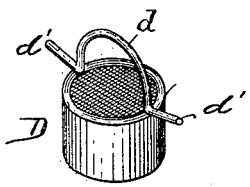
Fig. 3
Witnesses:
Walter S. Wood
J. G. Parkhurst
Inventor:
Claude Bennett
by [signature]
Atty

UNITED STATES PATENT OFFICE.

CLAUDE BENNETT, OF DECATUR, MICHIGAN.

MILK-PAIL.

SPECIFICATION forming part of Letters Patent No. 500,094, dated June 20, 1893.

Application filed September 27, 1890. Serial No. 366,411. (No model.)

*To all whom it may concern:*

Be it known that I, CLAUDE BENNETT, of Decatur, in the county of Van Buren and State of Michigan, have invented a new and Improved Combination Milk-Pail; and I do hereby declare that the following is a full and exact description thereof, reference being had to the accompanying drawings, and to the letters of reference marked thereon.

This invention relates to improvements in milk pails.

The object of the invention is to provide a pail which can be used as a stool in milking, said pail having an aperture for the reception of one end of a section of flexible pipe, the opposite end of which is attached to a milk receiving receptacle or funnel having a strainer; and it consists in the construction and combination of the parts, as will be hereinafter fully set forth and particularly pointed out in the claim.

In the accompanying drawings forming part of this specification: Figure 1 is a sectional view of a milk pail constructed in accordance with my invention. Fig. 2 is a detail view showing the strainer and a part of the funnel. Fig. 3 is a detail perspective view of the strainer detached.

A designates the pail, which is provided with an aperture having a sleeve $a$ into which is passed one end of a section of flexible hose B, the opposite end being attached to a funnel C. The funnel has tapered lower walls as shown and a conical portion C terminating in a nozzle to which the upper end of the section of hose B is attached. The portion C of the funnel is adapted to receive a strainer D, which is provided with a bail $d$ having outturned ends $d'$ adapted to be passed under ears $e$ attached to the bottom as shown, and by simply turning the bail the strainer can be made fast or detached from the funnel.

The pail A is provided with a suitable cover and bail, and when the device is in use this pail is adapted to be used as a stool and the funnel held between the knees of the operator, and when so held can be placed at the desired inclination or positioned beneath or adjacent to the cow's udder, as may be considered most desirable or convenient. It will be noted that by the use of this device the funnel can be readily moved and that the pail will be closed so that dirt or foreign material cannot find its way into the receptacle. Also that by the use of this device there is no danger of the pail being upset.

I am aware that prior to my invention it has been proposed to provide a milk bucket and stool with a spout or funnel, the parts being adapted to be readily connected to each other, and I do not claim such construction broadly as my invention, as it is obvious that should the funnel or spout be struck by the cow the spout would either be broken or injured and the bucket liable to be upset. With my improved device such objections are entirely obviated and the funnel can be positioned where desired.

Having thus described my invention, I claim—

In combination with a bucket A having a circular discharge opening near its upper edge, an outwardly projecting sleeve adjacent to said opening for receiving the lower end of a flexible tube B, a funnel C with a lower conical shaped portion $c$ terminating in a centrally located nozzle to fit into the upper end of the tube, a cylindrical shaped strainer D in the nozzle, ears $e$ in the funnel adjacent to the nozzle, and projecting ends of strainer bail $d$ engaging said ears, substantially as described and set forth.

In witness whereof I have hereunto set my hand this 1st day of October, A. D. 1889.

CLAUDE BENNETT.

Witnesses:
J. G. PARKHURST,
SHERMAN DEUEL.